United States Patent [19]
Oishi

[11] Patent Number: 5,793,582
[45] Date of Patent: *Aug. 11, 1998

[54] MAGNETIC DISK CARTRIDGE

[75] Inventor: Kengo Oishi, Kanagawa-ken, Japan

[73] Assignees: Fuji Photo Film Co., Ltd., Tokyo, Japan; Iomega Corporation, Roy, Utah

[*] Notice: This patent issued on a continued prosecution application filed under 37 CFR 1.53(d), and is subject to the twenty year patent term provisions of 35 U.S.C. 154(a)(2).

[21] Appl. No.: 695,418

[22] Filed: Aug. 12, 1996

[51] Int. Cl.$^6$ ........................................ G11B 23/03
[52] U.S. Cl. ................................. 360/133; 369/291
[58] Field of Search .......................... 360/132, 133; 369/289, 290, 291; 206/307, 308.1, 308.3

[56] References Cited

U.S. PATENT DOCUMENTS

| | | | |
|---|---|---|---|
| 4,908,726 | 3/1990 | Kato | 360/133 |
| 5,161,081 | 11/1992 | Machida et al. | 369/291 |
| 5,475,674 | 12/1995 | Yamashita et al. | 369/291 |

FOREIGN PATENT DOCUMENTS

| | | | |
|---|---|---|---|
| 266794 | 5/1988 | European Pat. Off. | 360/133 |
| 494407 | 7/1992 | European Pat. Off. | 206/308.1 |
| 63-253581 | 10/1988 | Japan | 360/133 |
| 4114382 | 4/1992 | Japan | 369/291 |

*Primary Examiner*—Stuart S. Levy
*Assistant Examiner*—David L. Ometz
*Attorney, Agent, or Firm*—Sughrue, Mion, Zinn, Macpeak & Seas, PLLC

[57] ABSTRACT

A magnetic disk cartridge has one cassette shell half formed with a thin-walled portion by providing a recess in an outer surface thereof, the recess is covered with a rigid plate member in the manner of a ceiling and a labeling region is provided on the rigid plate member. The structure reduces the weight and enhances the productivity and quality of the cassette shell.

13 Claims, 2 Drawing Sheets

F I G. 1
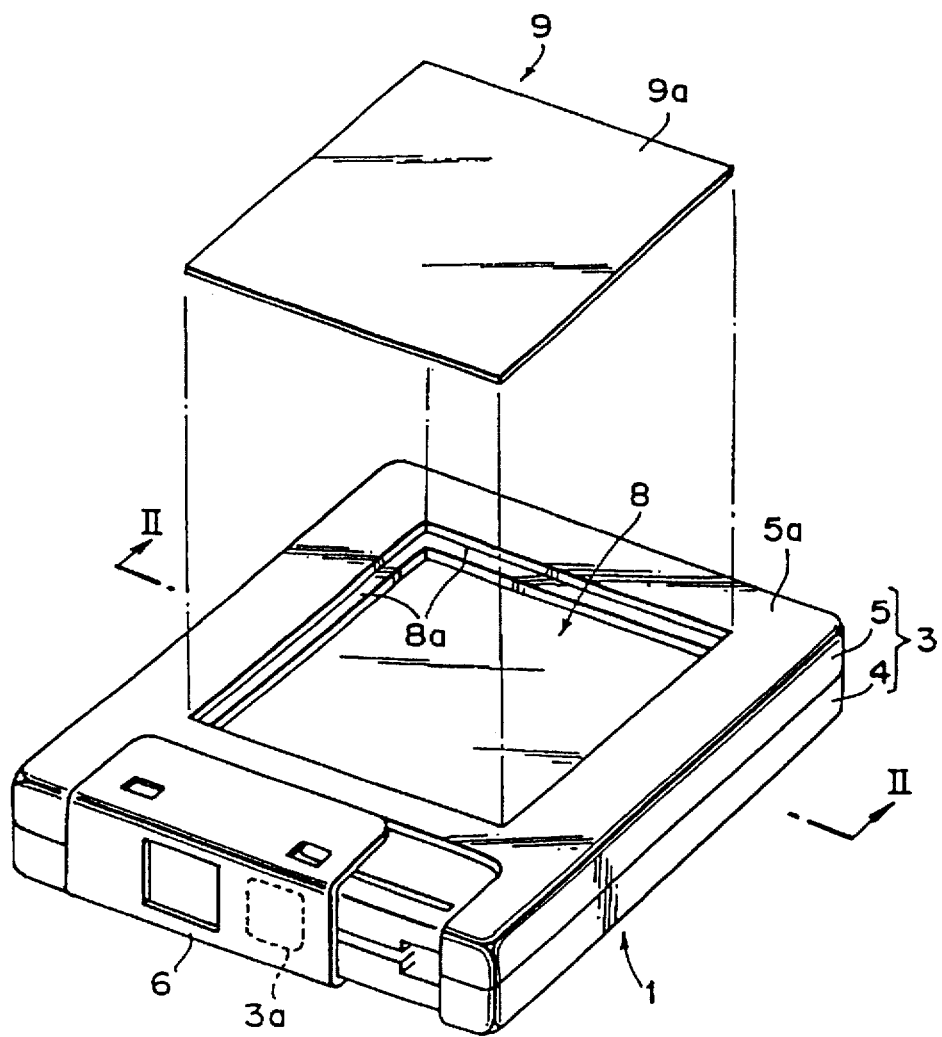

MAGNETIC DISK CARTRIDGE

BACKGROUND OF THE INVENTION

1. Field of the Invention

The present invention relates to a magnetic disk cartridge, more particularly to an improved magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell constituted of a pair of plastic cassette shell halves that are mated and joined together. The cassette shell is formed in the shape of a flat prism (substantially a hexahedron) with an approximately square top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use.

Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

In recent years, new high-density recording methods have led to the development of a magnetic disk cartridge with 50 times the capacity of the widely used conventional magnetic disk cartridge (3.5-inch floppy disk). In order to increase the recording density and the data transfer rate of such a high-capacity magnetic disk cartridge, the magnetic disk is rotated at a much faster speed than the conventional one and the magnetic heads used for recording and reproducing signals to/from the magnetic disk are required to be positioned with very high precision.

In addition, the high-capacity magnetic disk cartridge is provided in one side surface of the cassette shell with a magnetic head access opening of a size enabling access to the opposite surfaces of the magnetic disk from the exterior. Magnetic recording and reproducing heads are inserted through this hole and brought close to the rapidly rotating magnetic disk to conduct recording and reproduction. The cassette shell is therefore required to be thick enough to allow insertion of the magnetic heads.

On the other hand, since the magnetic disk rapidly rotated inside the cassette shell is made of a flexible material, it has to be prevented from flopping during rotation and the space inside the cassette shell has to be precisely formed to suitable dimensions (generally to a thickness equal to that of the magnetic disk and the liners plus some amount of clearance). The required size can be achieved with high precision only if the cassette shell has sufficient rigidity, while sufficient rigidity can be obtained only if the cassette shell has sufficient thickness.

The thickness of the cassette shell therefore has to be made twice or more than that of the conventional 3.5-inch floppy disk having a thickness of about 3mm. Accordingly, the wall thickness of the pair of cassette shell halves mated and joined to form the cassette shell also require a fairly large thickness.

However, a cassette shell with such a thick-walled structure has the drawback of being heavy and of increasing production cost owing to the large amount of material and long molding time required. Moreover, deformations known as sink marks are liable to occur in the thick-wall portions and give rise to degraded dimensional precision and poor appearance. These are quality problems that cannot be ignored.

SUMMARY OF THE INVENTION

This invention was accomplished in light of the foregoing and has as its object to provide a high-density magnetic disk cartridge having a light-weight cassette shell which can be efficiently produced with high quality.

For achieving this object, one aspect of the invention provides a magnetic disk cartridge comprising: a magnetic disk; a center core supporting the center of the magnetic disk; a cassette shell encasing the magnetic disk to be rotatable therein and being formed in one side surface with a magnetic head access opening, the cassette shell including a first cassette shell half formed with an open portion through which the center core is exposed and a second cassette shell half mating with the first cassette shell half, an outer surface of the second cassette shell half lying parallel to the magnetic disk being formed with a recess which reduces wall thickness of a portion of the second cassette shell half; a shutter member for opening and closing the magnetic head access opening; and a rigid plate member forming a ceiling covering the recess. When a labeling region is provided on the floor of the recess, the rigid plate member is made of a transparent material enabling a label affixed to the labeling region to be viewed from the exterior.

The periphery of the recess is preferably formed with a step for supporting the periphery of the rigid plate member.

Another aspect of the invention provides a magnetic disk cartridge comprising: a magnetic disk; a center core supporting the center of the magnetic disk; a cassette shell encasing the magnetic disk to be rotatable therein and being formed in one side surface with a magnetic head access opening, the cassette shell including a first cassette shell half formed with an open portion through which the center core is exposed and a second cassette shell half mating with the first cassette shell half, an outer surface of the second cassette shell half lying parallel to the magnetic disk being formed with a recess which reduces wall thickness of a portion of the second cassette shell half; a shutter member for opening and closing the magnetic head access opening; a transparent rigid plate member forming a ceiling covering the recess; and a labeling region provided on a floor of the recess. A label affixed to the labeling region can be viewed through the transparent plate member from the exterior.

In this case, a gap for insertion of labels into the recess can be provided between one edge portion of the recess and the corresponding edge portion of the rigid plate member.

The plate member can be made detachable or operable with respect to the second cassette shell half provided with the recess.

The recess can be adapted to hold a number of labels.

BRIEF DESCRIPTION OF THE DRAWINGS

FIG. 1 is a perspective view of a magnetic disk cartridge which is an embodiment of the invention shown with a rigid plate member thereof removed.

DESCRIPTION OF THE PREFERRED EMBODIMENTS

Embodiments of the magnetic disk cartridge of the present invention will hereinbelow be described with reference to the accompanying drawings.

Figure 2:
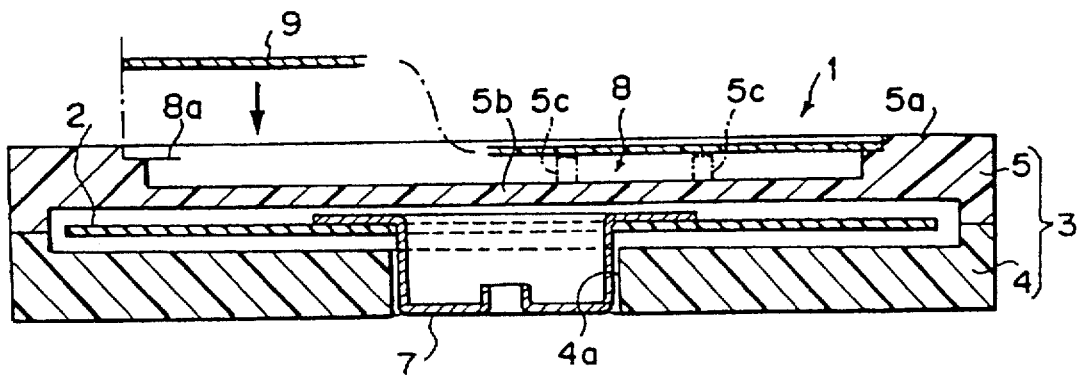
FIG. 2 is a sectional view taken along line II—II in FIG. 1.

FIGS. 1 and 2 show a magnetic disk cartridge which is an embodiment of the invention. FIG. 1 is a perspective view showing the magnetic disk cartridge with a rigid plate member thereof removed and FIG. 2 is a sectional view taken along line II—II in FIG. 1.

The magnetic disk cartridge, designated by reference numeral 1, has a cassette shell 3 encasing a rotatable magnetic disk 2. The cassette shell 3 is formed of a pair of lower (first) and upper (second) cassette shell halves 4, 5 which are both made of molded plastic. A magnetic head access opening 3a is formed in one side surface of the cassette shell 3 for enabling magnetic reproducing and recording heads to be brought close to the opposite surfaces of the magnetic disk 2 from the exterior, and a sectionally u-shaped shutter member 6 is provided to be slidable along the cassette shell for opening and closing the magnetic head access opening 3a. FIG. 1 shows the magnetic head access opening 3a closed by the shutter member 6.

The first cassette shell half 4, located on the lower side in the figures, is formed with a circular open portion 4a through which a center core 7 supporting the center of the magnetic disk is exposed. The second cassette shell half 5, located on the upper side, is formed in its upper surface, namely its outer surface 5a lying parallel to the magnetic disk 2, with a square, flat recess 8 covering most of the area of the outer surface 5a. The middle portion of the second cassette shell half 5 forming the floor of the recess 8 is a thin-walled portion 5b. A step 8a is formed around the periphery of the recess 8. As shown in dashed lines in FIG. 2, reinforcing projections 5c can be provided on the floor of the recess 8.

The recess 8 is covered with a rigid plate member 9 in the manner of a ceiling. The rigid plate member 9 is constituted as a thin, square plate of plastic, metal or the like having a planar configuration matching that of the recess 8. The peripheral portion of the rigid plate member 9 rests on the step 8a. The step 8a is formed to a depth from the outer surface 5a of the second cassette shell half 5 that is equal to or greater than the thickness of the rigid plate member 9.

The rigid plate member 9 is generally fixed (bonded or adhered) to the second cassette shell half 5 as supported on the step 8a. When the rigid plate member 9 is formed of thin sheet metal or other such opaque material, a labeling region is provided on its outer surface 9a.

Figure 3:
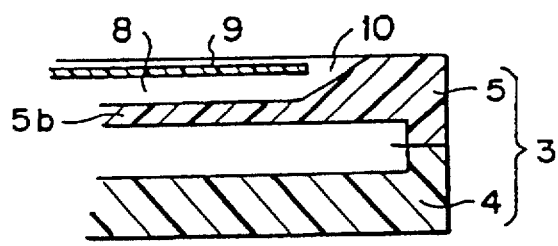
FIG. 3 is a sectional view of an essential portion of another embodiment of the invention.
Figure 4:
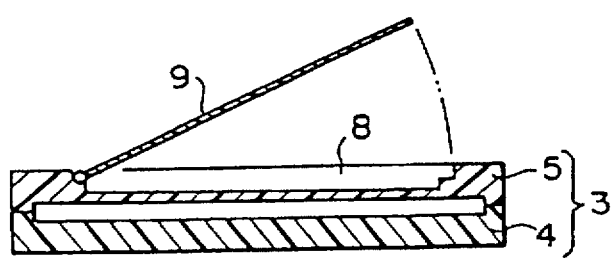
FIG. 4 is a sectional view for explaining another embodiment of the invention.

When the rigid plate member 9 is formed of transparent plastic, the labeling region is provided on the floor of the recess 8, where it can be seen through the transparent rigid plate member 9. In this case, a gap 10 (FIG. 3) is provided between one edge portion of the recess 8 and the corresponding edge portion of the rigid plate member 9 so that labels can be easily replaced by inserting them into and removing them from the recess 8 through the gap 10. A portion of the rigid plate member 9 on the side of the gap 10 can be notched into a finger hole allowing labels to be removed with ease. In addition, a rib or the like can be provided in the recess 8 for dividing the recess 8 into a section for a permanently attached label and a section for replaceable labels. It is also possible to make the rigid plate member 9 operable with respect to the second cassette shell half 5, as shown in FIG. 4, or to make it detachable with respect thereto. Such an arrangement further facilitates label replacement.

When the labeling region is provided on the outer surface 9a of the rigid plate member 9, the space inside the recess 8 can be made usable for storing blank labels by making the rigid plate member 9 operable or detachable with respect to the second cassette shell half 5.

In all of the embodiments described in the foregoing, the provision of the recess 8 forms the second cassette shell half 5 with the thin-walled portion 5b and the recess 8 is covered with the rigid plate member 9 in the manner of a ceiling. As a result, the cassette shell 3 is reduced in weight, its productivity is enhanced owing to shorter molding time, it can be molded to precise internal dimensions, and its labeling region is attractive in appearance.

The arrangement in which the rigid plate member 9 is made transparent and the labeling region is provided on the floor of the recess 8 is particularly effective in protecting the label from defacement.

Since the magnetic disk cartridge according to the invention has a cassette shell whose portion corresponding to the labeling region is formed at the exterior with a recess which reduces the wall thickness of the cassette shell and the top of the recess is covered by a thin, rigid plate member, the cassette shell is reduced in weight and can be more efficiently produced owing to the shorter molding time required. In addition, the cassette shell can be molded to precise internal dimensions and with an attractive labeling region.

When the rigid plate member is made of transparent material and the labeling region is provided on the floor of the recess, a label affixed to the labeling region is particularly well protected from defacement. Moreover, when this configuration is adopted, label replacement can be facilitated by providing a gap for insertion of labels into the recess between one edge portion of the recess and the corresponding edge portion of the rigid plate member or by making the plate member operable or detachable with respect to the second cassette shell half.

On the other hand, when the labeling region is provided on the outer surface of the rigid plate member, the space inside the recess can be made usable for storing blank labels by making the rigid plate member operable or detachable with respect to the second cassette shell half.

What is claimed is:

1. A magnetic disk cartridge comprising:
   a magnetic disk,
   a center core supporting a center of the magnetic disk,
   a cassette shell encasing the magnetic disk, said magnetic disk being rotatable therein, said cassette shell being formed in one side surface thereof, with a magnetic head access opening, the cassette shell including
      a first cassette shell half formed with an open portion through which the center core is exposed and
      a second cassette shell half mating with the first cassette shell half, an outer surface of the second cassette shell half lying parallel to the magnetic disk, said second cassette shell half being formed with a recess including a horizontal step, which is disposed below said outer surface of the second cassette shell half, and a floor wherein said of horizontal step cuts into and reduces a wall thickness of a portion of the second cassette shell half, and wherein a depth of the recess causes said floor of the recess to be formed as a thin-walled portion centered over a central portion of said magnetic disk, a shutter member for opening and closing the magnetic head access opening, a rigid plate member forming a ceiling covering the recess, and a labeling region provided on an outer surface of the plate member.

2. A magnetic disk cartridge comprising:

a magnetic disk, a center core supporting a center of the magnetic disk, a cassette shell encasing the magnetic disk, said magnetic disk being rotatable therein, said cassette shell being formed in one side surface thereof, said cassette shell with a magnetic head access opening, the cassette shell including a first cassette shell half formed with an open portion through which the center core is exposed and a second cassette shell half mating with the first cassette shell half, an outer surface of the second cassette shell half lying parallel to the magnetic disk, said second cassette shell half being formed with a recess including a horizontal step, which is disposed below said outer surface of the second cassette shell half, and a floor wherein said of horizontal step which cuts into and reduces a wall thickness of a portion of the second cassette shell half, and wherein a depth of the recess causes said floor of the recess to be formed as a thin-walled portion centered over a central portion of said magnetic disk, a shutter member for opening and closing the magnetic head access opening, a transparent rigid plate member forming a ceiling covering the recess, and a labeling region provided on an outer surface of the plate member.

3. A magnetic disk cartridge as defined in claim 1 or 2, wherein said horizontal step supports a periphery of the rigid plate member.

4. A magnetic disk cartridge as defined in claim 3, wherein the plate member is detachable with respect to the second cassette shell half provided with the recess.

5. A magnetic disk cartridge as defined in claim 4, wherein the recess is adapted to hold a number of labels.

6. A magnetic disk cartridge as defined in claim 3, wherein the plate member is operable with respect to the second cassette shell half provided with the recess.

7. A magnetic disk cartridge as defined in claim 6, wherein the recess is adapted to hold a number of labels.

8. A magnetic disk cartridge as defined in claim 2, wherein a gap for insertion of lables into the recess is provided between one edge portion of the recess and a corresponding edge portion of the rigid plate member.

9. A magnetic disk cartridge as defined in claims 1 or 2, wherein the plate member is detachable with respect to the second cassette shell half provided with the recess.

10. A magnetic disk cartridge as defined in claim 9, wherein the recess is adapted to hold a number of labels.

11. A magnetic disk cartridge as defined in claims 1 or 2, wherein the plate member is operable with respect to the second cassette shell half provided with the recess.

12. A magnetic disk cartridge as defined in claim 11, wherein the recess is adapted to hold a number of labels.

13. A magnetic disk cartridge comprising a magnetic disk, a center core supporting a center of the magnetic disk, a cassette shell encasing the magnetic disk, said magnetic disk being rotatable therein, said cassette shell being formed in one side surface thereof with a magnetic head access opening, the cassette shell including a first cassette shell half formed with an open portion through which the center core is exposed and a second cassette shell half mating with the first cassette shell half, an outer surface of said second cassette shell half lying parallel to the magnetic disk, said second cassette shell half being formed with a recess covering most of a surface area of said outer surface, and said second cassette shell half having a wall thickness of a portion of said second cassette shell half which is slanted in an incline upward toward said outer surface, a shutter member for opening and closing the magnetic head access opening, and a rigid plate member forming a ceiling covering the recess, wherein a gap for insertion of labels into the recess is provided between one edge portion of the recess formed by said portion of said second cassette shell half which is slanted in said incline upward toward said outer surface and a corresponding edge portion of the rigid plate member.

* * * * *